United States Patent [19]

Pabst et al.

[11] 4,221,766

[45] Sep. 9, 1980

[54] MINIMIZING SOLUBLE IRON CONCENTRATION IN A PLANT EFFLUENT

[75] Inventors: Wilfred A. Pabst, Hightstown, N.J.; David Crabbe, St. Louis, Mo.

[73] Assignee: Cities Service Company, Tulsa, Okla.

[21] Appl. No.: 749,645

[22] Filed: Dec. 10, 1976

Related U.S. Application Data

[63] Continuation-in-part of Ser. No. 619,718, Oct. 6, 1975, abandoned.

[51] Int. Cl.$^2$ .............................................. C01G 49/02
[52] U.S. Cl. ..................................... 423/140; 423/633
[58] Field of Search ................................ 423/140, 633

[56] References Cited

U.S. PATENT DOCUMENTS

| | | | |
|---|---|---|---|
| 2,939,767 | 6/1960 | Martin | 423/633 |
| 3,845,198 | 10/1974 | Marcot | 423/633 |

*Primary Examiner*—Wayne A. Langel
*Attorney, Agent, or Firm*—George L. Rushton

[57] ABSTRACT

This process reduces the soluble iron found in the final effluent of a plant making iron oxide by the Penniman-Zoph scrap process. The finished oxide product slurry is separated from the scrap iron, and the slurry is aerated while the pH is maintained between about 3.0 and 5.0. As the soluble iron is converted to product oxide, the pH of the system rises toward the higher value.

3 Claims, No Drawings

MINIMIZING SOLUBLE IRON CONCENTRATION IN A PLANT EFFLUENT

CROSS-REFERENCE TO RELATED APPLICATION

This application is a continuation-in-part of copending application Ser. No. 619,718, filed Oct. 6, 1975, now abandoned.

BACKGROUND OF THE INVENTION

This invention concerns the manufacture of synthetic iron oxide. More particularly, it concerns the minimizing of the soluble iron in the liquid effluent from a typical scrap iron process. The utility of the invention resides in (a) increased efficiency of the process and (b) the reduced amount of soluble iron discharged to the environment.

The production of pigmentary iron oxides by the scrap iron process is well known and is described in the Martin patent, U.S. Pat. No. 2,939,767. This patent also discloses some of the names used for pigmentary yellow iron oxide, such as alpha ferric oxide hydrate. We prefer to use the simple designation of "iron oxide" for the yellow iron oxide product prepared in this disclosure.

In a typical scrap iron process, such as the Penniman-Zoph process outlined in the Martin patent, and well known in the pigment industry, the liquid effluent obtained at the completion of the reaction contains residual iron ion as $Fe^{++}$. One prior method of utilizing this residual iron has been the uncontrolled addition of hydroxide iron to the scrap tank, with scrap present. This method forms a mixture of products, such as ferrous hydroxide and ferric hydroxide, which tends to lower the quality of the finished oxide product. Another way of treating the residual iron ion is to remove the mixture of iron oxide and accompanying effluent from the reaction tank and filter the mixture. The filtrate is then treated with alkali and aeration, with a typically undesirable product obtained, due to low concentration of ferrous iron, short retention time, and absence of seed crystals. Since dumping of the iron ion-containing effluent to the sewer or nearby stream is prohibited and since prior attempts to utilize the low concentration of soluble iron give low-grade products, the industry has sought alternative methods of utilizing the effluent stream and obtaining desirable iron oxide.

SUMMARY OF THE INVENTION

We believe we have discovered (a) a way of improving the efficiency of an iron oxide process and (b) a way of environmentally improving the liquid effluent stream of an iron oxide plant. In a plant producing pigmentary iron oxide by the Penniman-Zoph scrap iron process, wherein the material found at the conclusion of the batch process comprises residual scrap iron and a slurry comprising iron oxide and dissolved iron in an aqueous component,
the improvement which comprises
a method of minimizing the soluble iron concentration in the plant effluent, comprising the steps of
(a) separating said residual scrap iron from said aqueous slurry,
(b) neutralizing the slurry in a controlled manner, and
(c) aerating the slurry during the controlled neutralization, thus forming additional iron oxide of marketable quality from the soluble iron component.

By using our method, we have succeeded in markedly reducing the iron content in the finally-discharged plant effluent, at the same time obtaining additional, desirable iron oxide.

DETAILED DESCRIPTION OF THE INVENTION

In the scrap iron (Penniman-Zoph) method of making iron oxide, the typical process is as follows: A seed slurry of finely-divided ferric hydroxide is prepared, mixed with a dilute ferrous salt solution, and pumped to a reaction tank provided with a rack containing a quantity of iron metal scrap. The temperature of the slurry is then raised to about 160° F., and a current of air is passed through the reaction mixture. The result of the reaction is that iron is converted to iron oxide, typically with a small amount of soluble iron in the liquid mixture when the overall process is halted.

The first step of our invention takes place when the overall batch process is stopped and comprises separating the unreacted scrap iron from the iron oxide product slurry. This can be done by removing the scrap iron from the reaction tank or by pumping the product slurry to another tank, preparatory to further processing.

The product slurry comprises finished iron oxide particles as the solid phase, with the liquid phase being an aqueous solution of soluble iron, typically as dissolved ferrous sulphate, and small amounts of other materials typically found in the scrap iron process. The liquid phase of the product slurry is mainly a dilute solution of soluble iron. Other soluble materials, obtain from the scrap iron process, can be present but they are typically even more dilute in concentration. The ratio of solid to liquid of the product slurry is dependent upon the particular manner in which the scrap iron process is carried out. This ratio can vary from about 60 to about 150, based on grams of iron oxide per liter of product slurry, with a preferred ratio range of about 80 to about 120.

The concentration of soluble iron, expressed as grams of $Fe^{++}$ per liter of liquid, varies from about 0.1 to about 20, with a more preferred range of from about 5 to about 15. The concentration of soluble iron depends upon several factors and is not critical, since the aim of the invention is to convert as much of the soluble iron into iron oxide of marketable quality product as is possible, in order to improve the efficiency of the overall process and to avoid environmental problems.

Neutralization of the product slurry is the next step in our invention. Broadly, this neutralization can be carried out by a number of compounds, but, to avoid undesirable products and excessive costs, the preferred neutralizing agents are chosen from the group consisting of ammonium hydroxide and the oxides, hydroxides, and carbonates of sodium and potassium. As preferred agents, ammonium hydroxide, sodium hydroxide, and sodium carbonate are efficient and commercially available. Typically, the pH of the product slurry from the reaction tank is in the range of from about 1.5 to about 3.0. During the bulk of the neutralization, the pH of the mixture is maintained between 3.0 and 4.0, preferably between 3.3 and 3.7. Then, as the $Fe^{++}$ concentration is depleted, the pH is allowed to increase to about 3.4–5.5, preferably from about 4.0 to about 5.0, to insure maximum iron removal. Neutralization is carried out by controlled addition of the alkaline reagent to the product slurry, with agitation. This controlled neutralization is in contradistinction to prior art methods of adding uncontrolled amounts, such as "slugs", of alkaline reagents, resulting in localized regions of high pH, which tend to result in the production of undesirable iron oxides. The concept of "controlled neutralization" may be expanded by assuming that a solution contains a certain amount of soluble iron, at a certain pH, generally in the range of 1.5–3.0. In order to neutralize this material without product deterioration, the neutralization has to be in a controlled manner. This means the alkali required for the neutralization is added by a control valve, for example, which is controlled by a pH probe. If the set point of the controller is set at a pH of 3.5 for example, then, during the course of the neutralization of the soluble iron, the amount of iron will be depleted slowly, and the control valve during this period will allow less and less alkali into the tank. Thus, to maintain a controlled addition of alkali for the neutralization of the soluble iron, the rate of addition of the alkali is reduced automatically, as the amount of available soluble iron is reduced, or, in other words, during this neutralization the control valve will allow less and less alkali addition in order to maintain the pH set at the control as the soluble iron is depleninshed. In practice, if the set points were to be raised all the way initially, the control valve would allow too much alkali to enter the tank during the initial phase, when the concentration of soluble iron is still relatively high. This would result in a too rapid precipitation of undesirable by-products. The main point of "controlled neutralization" is that the rate of addition of the alkali is related to the amount of soluble iron left, to maintain the desired pH range set at the controller. Depending on various operating conditions, the rate of addition of the neutralizing agent can vary from about 0.0025 to 0.02 lbs. of hydroxyl equivalent/hr./gal, preferably from about 0.006 to about 0.012, and most preferably from about 0.01 to about 0.011.

The aeration step is carried out concurrently with the neutralization step. Aeration can be the major source of agitation, or it can be supplemented by mechanical agitators. The rate of aeration, defined as pounds of oxygen per hour per gallon of total reaction mixture varies from about 0.01 to about 0.15, preferably from about 0.07 to about 0.1. Aeration is the preferred method of oxidizing the ferrous hydroxide to the ferric hydroxide form. The most convenient source of aeration is by bubbling air through the reaction mixture. If desired, oxygen or oxygen-enriched air may be used in place of air. The rate of oxidation is highly dependent upon the amount of available oxygen, and thus the aeration rate is important.

Broadly, the temperature for the reaction to oxidize the residual soluble iron ranges from about 120° F. to about 180° F. Preferably, the reaction temperature is controlled in the range of from about 140° to about 165° F., and most preferably the temperature range is about 153°–157° F. It is recognized that if the reaction temperature is too low, the rate of reaction is slowed, with the counteracting factor that more dissolved oxygen is available at the lower temperature. On the other hand, at the higher temperature, the reaction raises faster, but there is less dissolved oxygen available. The preferred range has been found to give the best results.

The reaction time for this finishing portion of the process, stated with zero time being when the slurry is contacted with air and neutralizing agent, can vary from about 2 to about 10 hours, depending upon the amount of soluble iron present. The reaction time can be shortened by increasing the temperature and aeration rate, but such a practice usually results in a poorer grade of pigment. On the other hand, a longer reaction time may give a slightly higher grade of pigment, but the efficiency of use of the reactor volume is lower.

When the oxidation of the residual soluble iron in the product slurry is substantially complete, as determined by typical laboratory methods, the reaction mixture can be further processed by filtration, washing of the oxide, drying and grinding.

The aqueous effluent from the oxide process now has a reduced concentration of soluble iron, compared with the liquid portion of the original product slurry.

EXAMPLE I

From the scrap process for the manufacture of yellow iron oxide pigment was obtained 70 gallons of a slurry comprising 0.6 lb./gal. of suspended iron oxide and a concentration of soluble iron equivalent to 0.34 lb./gal. of cooperas (as $FeSO_4 \cdot 7H_2O$).

This mixture was treated with air at 0.09 lb./hr./gal. at 155° F., and the pH was maintained at about 3.5 by the addition of $NH_3$ vapor, until the $Fe^{++}$ concentration was reduced to about 5 ppm. The reaction time was 6 hours.

This procedure yielded 49.8 lbs. of a high quality pigment grade iron oxide matching commercial standards. This means that 7.8 lbs. of desirable iron oxide were produced from the residual soluble iron, which would have been discarded or dumped under prior art methods.

EXAMPLE II

Using a volume of 70 gals. of slurry containing 0.8 lb./gal. of iron oxide and a concentration of soluble iron equivalent to 0.34 lb./gal. of cooperas, air was introduced at a rate of 0.1 lbs. $O_2$/hr./gal. at 160° F., with the pH maintained at about 4.0 by the addition of 50 wt.% NaOH solution, until the $Fe^{++}$ concentration was reduced to about 5 ppm. The reaction time was 6 hours.

In this procedure, 63.8 lbs. of high quality pigment grade iron oxide were obtained, meaning that 7.8 lbs. of iron oxide were salvaged from the soluble portion of the effluent.

We claim:

1. In a plant producing pigmentary iron oxide by the Penniman-Zoph scrap iron process, where the material found at the conclusion of the process comprises residual scrap iron and a slurry comprising iron oxide and dissolved iron in an aqueous component, the improvement which comprises
   a method of minimizing the soluble iron concentration in the plant effluent, comprising the steps of
   (a) separating said residual scrap iron from said aqueous slurry,
   (b) neutralizing the slurry in a controlled manner by adding a neutralizing agent chosen from the group consisting of ammonium hydroxide and the oxides, hydoxides, and carbonates of sodium and potassium, so that the pH of the slurry is maintained between about 3.0 and 4.0 during the bulk of the neutralization and then is allowed to rise to a range of about 4.0 to about 5.0 as the $Fe^{++}$ concentration is depleted, and (c) aerating the slurry during the controlled neutralization, thus forming additional iron oxide of marketable quality from the soluble iron component.

2. The method of claim 1, wherein
(a) the rate of addition of neutralizing agent is from about 0.0025 to about 0.02 lbs. of hydroxyl equivalent /hr./ gal. of slurry,
(b) the aeration rate is from about 0.01 to about 0.15 lbs. $O_2$/hr./gal. slurry reaction mixture,
(c) the reaction temperature is from about 120° F. to about 180° F., and
(d) the reaction time is from about 2 to about 10 hours.

3. The method of claim 2, wherein
(a) the rate of addition of neutralizing agent is from about 0.006 to about 0.012,
(b) the aeration rate is from about 0.07 to about 0.1, and
(c) the reaction temperature is from about 140° to about 165° F.